US006977356B2

(12) United States Patent
Vaidyanathan et al.

(10) Patent No.: US 6,977,356 B2
(45) Date of Patent: Dec. 20, 2005

(54) STEREOVISION GUIDED LASER DRILLING SYSTEM

(75) Inventors: Janakiraman Vaidyanathan, South Windsor, CT (US); Kenneth Pietrzak, Saunderstown, RI (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/674,997

(22) Filed: Sep. 30, 2003

(65) Prior Publication Data

US 2005/0067394 A1 Mar. 31, 2005

(51) Int. Cl.[7] ........................ B23K 26/38; B23K 26/03

(52) U.S. Cl. ........................ 219/121.71; 219/121.7; 219/121.83

(58) Field of Search ........................ 219/121.7, 121.71, 219/121.83; 348/187; 382/141, 106; 700/166; 356/3.13, 12

(56) References Cited

U.S. PATENT DOCUMENTS 3,463,594 A * 8/1969 Myer ........................ 356/399
4,545,018 A * 10/1985 Clements et al. ........... 700/166
4,663,511 A * 5/1987 Tallman ................. 219/121.13
4,727,471 A 2/1988 Driels et al.
5,125,035 A * 6/1992 McCarthy et al. .......... 382/141
5,216,808 A 6/1993 Martus et al.
5,297,238 A 3/1994 Wang et al.
5,384,717 A * 1/1995 Ebenstein ................... 702/167
5,577,130 A * 11/1996 Wu ........................... 382/106
6,292,584 B1 * 9/2001 Dulaney et al. ............ 382/151
6,321,137 B1 * 11/2001 De Smet .................... 700/245
6,380,512 B1 * 4/2002 Emer .................... 219/121.71
6,615,099 B1 * 9/2003 Muller et al. ............... 700/166
6,683,977 B1 * 1/2004 Albrecht et al. ............ 382/154
6,723,951 B1 * 4/2004 McGraw ................ 219/121.71
2002/0076097 A1 * 6/2002 Vaidyanathan .............. 382/154
2003/0142862 A1 * 7/2003 Snow et al. ................ 382/154
2003/0222984 A1 * 12/2003 Zhang ........................ 348/187

FOREIGN PATENT DOCUMENTS

DE 4207169 A1 * 9/1993
JP 5-111782 A * 5/1993
WO WO 99/12082 3/1999

OTHER PUBLICATIONS

Article entitled "On Vision-Based Robot Calibration", by Hanqui Zhuang et al., (Southcon/94, Conference Record, Orlando, FL, Mar. 29-31, 1994) New York, IEEE, US, Mar. 29, 1994, pp. 104-109.

* cited by examiner

*Primary Examiner*—Geoffrey S. Evans
(74) *Attorney, Agent, or Firm*—Bachman & LaPointe, P.C.

(57) ABSTRACT

A method for assisting the laser drilling of a hole in a part comprises the steps of providing a camera mounted to the laser, providing a target hole at a first position, capturing a first image of the target hole at the first position with the camera, moving the target hole to a second position and capturing a second image of the target hole, and computing a drilling location of the target hole from the first image and the second image, said computed drilling location used to laser drill the target hole.

11 Claims, 1 Drawing Sheet

STEREOVISION GUIDED LASER DRILLING SYSTEM

BACKGROUND OF THE INVENTION (1) Field of the Invention

The present invention relates to an apparatus, and method for so using, for locating and finish drilling cooling holes using a stereovision guided laser drilling process.

(2) Description of the Related Art

In the turbine blades/vanes manufacturing process, the parts are first precision-cast and then the cooling holes are installed either by laser drilling or by electrical discharge machining (EDM). A method that casts the cooling holes at the time of casting the part, offers the advantage of process simplification with enhanced quality and precision. In addition, complex cooling hole schemes, such as shaped non-cylindrical holes with complex diffuser and metering section geometries, can be cast in by this process that are difficult to directly laser drill or EDM. However, even a high-precision casting process cannot fully cast the complete hole geometry due to the limitations of the casting process (cold shut, core mismatch, slag formation, etc.). These limitations result in partially cast holes—with most of the top portion of the hole geometry completely cast and the bottom portion of the hole geometry shut or plugged by debris or slag.

A CATSCAN system using Computer-aided Tomography, can give scanned slices of the part and by taking the scans very closely one can build up the inside and outside profiles of a part but this takes an inordinately long time to scan at the precision needed and also requires a separate radiation chamber. The evolving QMP (Quartz Micro Probing) system can locate the holes precisely but the rough locations must be known before hand. Also QMP takes a long time and cannot be mounted on the laser machine bed. 3D machine vision alternatives including structured light techniques, have proven difficult due to the depth or shallow angle of the cooling holes. What is therefore needed is an apparatus, and method for using the apparatus, which overcomes the shortcomings of the related art—capable of being mounted on the laser machine alongside the laser drill and with the necessary precision needed.

SUMMARY OF THE INVENTION

Accordingly, it is an object of the present invention to provide an apparatus, and method for so using, for locating and finish drilling cooling holes using a stereovision guided laser drilling process.

It is a further object of the present invention to provide a method for assisting the laser drilling of a hole in a part which comprises the steps of providing a camera mounted to the laser, providing a target hole at a first position, capturing a first image of the target hole at the first position with the camera, moving the target hole to a second position and capturing a second image of the target hole, and computing a drilling location of the target hole from the first image and the second image, the computed drilling location used to laser drill the target hole.

It is a further object of the present invention to provide an apparatus for laser drilling a hole in a part which comprises a laser, a target hole, a camera mounted to the laser for capturing a first image of a target hole on a part at a first position and a second image of the target hole at a second position, and means for computing a drilling location of the target hole from the first image and the second image.

It is a further object of the present invention to provide a vision system which comprises a single camera to image a part, a fixture for the part, the fixture movable between a first position where the camera can capture a first image of the part and a second position where the camera can capture a second image of the part, and means for computing a location of a target on the part from the first image and the second image.

DETAILED DESCRIPTION

It is therefore an object of the present invention to teach a method for locating and finish drilling partially cast-in holes in a precision-cast part by a stereovision guided laser drilling process. The vision-guided system mounted, or attached, to the laser drilling machine locates the position of each hole and guides the laser drill to the position of each hole to fire the laser pulses to finish drill the partially drilled holes. In a preferred embodiment, the machined part is a turbine blade and the holes are shaped cooling holes. By "mounted" it is meant that the vision system moves in a coordinated manner with the laser drilling machine.

Figure 1:
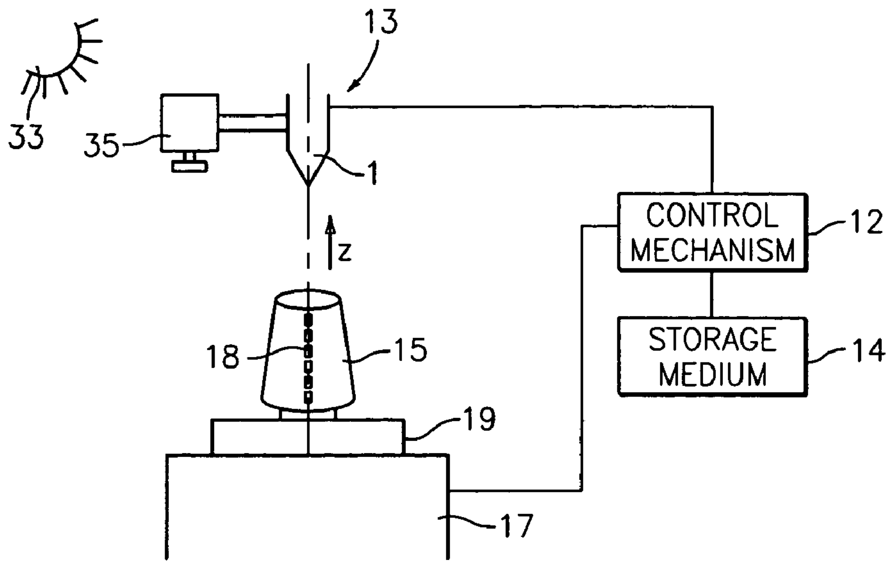
FIG. 1 is a diagram of the laser drilling system of the present invention.

The embodiment described herein can use a single Black & White CCD Video Camera with the desired pixel resolution (0.5 Mega pixel being the minimum; the higher the pixel resolution of the camera the more accurate the results) and a PC-based frame grabber. With reference to FIG. 1, there is illustrated one embodiment of the stereovision guided laser system of the present invention. As will be described more fully below, this single camera 35 is used to align the laser drilling system 13. In order to accomplish the alignment, it is necessary to calibrate the camera 35 after the camera 35 is mounted to the laser drilling system 13. The vision system hardware, consisting, in part, of the camera 35, is preferably mounted on laser machine slides, generally parallel to the laser axis and preferably offset by a few inches.

A camera calibration routine, running on control mechanism 12, calibrates the camera for the perspective transformation, scaling factors, radial lens distortion, and the transformation from the camera coordinate system, denoted by image pixels, to the machine coordinate system, comprising the three dimensional space through which the laser drilling equipment is manipulated. The laser drilling system 13, camera 35, and rotary mount are controlled by a control mechanism 12. Preferably, control mechanism 12 is an electronic computing drive. Control mechanism 12 could have a suitable processor capable of running computer programs, or applications, and have internal memory configured to store and retrieve electronic data from storage medium 14.

Figure 2:
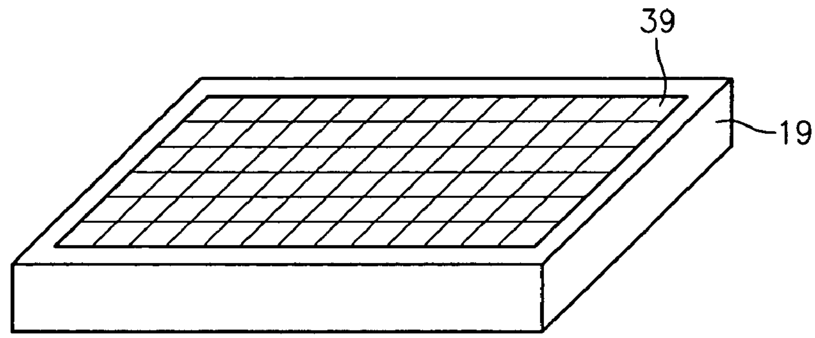
FIG. 2 is an illustration of the fixture and calibration target of the present invention.

Binocular stereovision is the process by which three-dimensional structure is recovered from a pair of images of a scene taken from slightly different viewpoints. The difference in positions causes relative displacements or disparities that enable the depth to be calculated by triangulation. One of the major problems in stereovision is matching features in the two images. By focusing on one target hole 18 at a time and working in a known orientation, feature matching is accomplished in the present invention. Normally, two cameras provide the pair of images required for stereovision in a similar fashion to human vision. In the present invention, however, by moving the target hole 18 to two different positions, a single camera 35 is utilized to obtain a pair of images. This method eliminates the need for a second camera. In a preferred embodiment, the target hole 18 is fabricated into a part 15 forming a turbine blade. The camera must be calibrated after initial assembly of the device to provide a 3D-to-2D mapping for stereovision. With reference to FIG. 2, there is illustrated the calibration target 39 required for camera calibration. In a preferred embodiment, the calibration target 39 comprises a backlit glass plate containing a grid of black squares of known location. Any calibration target may be utilized which provides a plurality of targets of known location in two dimensions. A 3D-to-2D mapping is generated using pairs of known world coordinates and measured camera coordinates for each corner of each square. This 3D-to-2D mapping is preferably stored on storage medium 14 and is capable of being queried as necessary. Using this 3D-to-2D mapping, the stereovision algorithm of the present invention combines the camera coordinates for a feature from each of two images captured from different perspectives to generate a 3D coordinate of the feature in the drilling machine's 13 coordinate system. This calibration may be repeated as necessary should misalignment occur but is not required for continuous operation.

The camera coordinates of each feature, such as target hole 18 of a part 15, are located by capturing and processing two images of the feature at two different perspectives. In the preferred embodiment, the part is moved to produce the two perspectives, however the camera can be moved in other embodiments. The present invention utilizes image processing software running on control mechanism 12 to process each of the two digitized images. The image processing software scans both images with a set of various sized rectangular models using a normalized correlation approach. The rectangular models are a set of image templates with various sizes and aspect ratios. The set should contain enough variety of sizes and aspect ratios so that one rectangle in the set will always match a rectangular hole feature. In the preferred embodiment, the rectangle is white with a black background. Any pattern recognition approach which can detect the location of rectangular features may be substituted here. A good match with any of the rectangular models indicates that the rectangular section at the bottom of a target hole 18 has been located.

In the case where there is more than one hole in either image, the image processing software selects the one that is closest to the nominal location. Ideally, the nominal location of the target hole 18 is stored in an electronic format, such as a CAD file, in storage medium 14 and is retrieved by the control mechanism 12 of the present invention. Using the 3D-to-2D mapping, the camera coordinates from each corner of the rectangle forming the target hole are converted to machine coordinates of the actual target hole location. These corner locations are then used to generate a drilling location located in the middle of the corner locations. The physical offset between the camera and laser is ascertained as described below and is used to identify the nominal drilling location for the laser.

Figure 3:
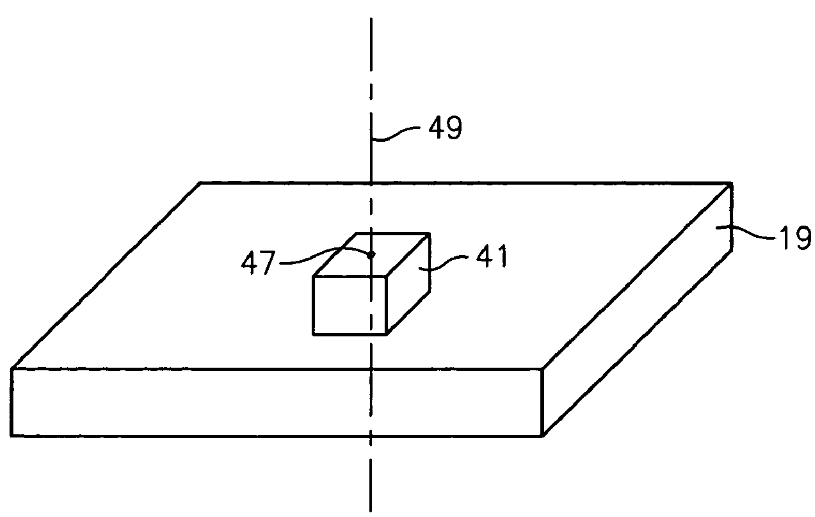
FIG. 3 is an illustration of the calibration block of the present invention.

With continued reference to FIG. 1, there is illustrated in detail the manner in which the vision system of the present invention is set up. In a preferred embodiment, a five-axis laser 1 is used to form the drilling system 13. The laser 1 of the drilling system 13 is preferably held stationary while the part 15 is moved under (CNC) computer numerical control guided by control mechanism 12. Preferably, the part 15 is mounted on a fixture that can be translated in the three principal axis directions and, using a rotary mount 17 preferably comprising two rotary tables, can provide three rotational degrees of freedom. This fixture manipulates the part 15 to allow the camera 35 to take images of the part 15 from different perspectives. A fixture 19 mounted on the machine table provides the reference for mounting either the calibration block 41 or the fixture carrying the part 15. The calibration block 41 is illustrated in FIG. 3. Calibration block 41 has a tiny pinhole 47 that is used by the laser drilling system 13 for providing the alignment of the laser axis 49 with a laser beam emitted from said laser. The same calibration block 41 is used to align the camera 35 with the laser axis and for offset calculations between the laser drilling system and the camera. The calibration block 41 is designed to carry a calibration target 39, preferably a square grid block, as was described above.

Referring to FIG. 1, the camera 35 is mounted to the laser drilling system 13. The laser 1 is aligned using the calibration block 41. The laser beam is positioned such that it passes through the center of the 0.001" diameter alignment hole 47. The machine home position is then reset to this location. Next, the camera calibration target 39 is mounted to the calibration block and the camera is calibrated by moving the z-axis incrementally to several positions and processing the resulting square pattern image at each position. A 3D-to-2D mapping is generated using pairs of known world coordinates and measured camera coordinates for each corner of each square. This 3D-to-2D mapping is preferably stored on storage medium 14 and is capable of being queried as necessary. Next, the machine position is adjusted so that the camera 35 is focused on the front of the laser alignment hole 47 and the imaged hole is at the nominal position in the image.

Next the alignment hole is imaged and processed to determine the 2D camera coordinates of the alignment hole 47. The camera 35 is then displaced by approximately 0.1 inches to obtain the 2D camera coordinates of the alignment hole from a second position. The stereovision algorithm is then applied to obtain the alignment hole position in machine coordinates using the parameters from the camera calibration stored in storage medium 14. The offset between the camera 35 and laser home position is then computed and recorded from the machine axes values.

In actual operation the part 15 is attached to the fixture. A nominal laser-drilling program, running on control mechanism 12, is used to initially position each target hole 17 in front of the camera by adding the pre-calibrated offset between the camera and laser to each nominal target hole 17 drilling location. As noted, the nominal portion of the target hole is stored in an electronic format, or blueprint, and retrieved. Using the stereovision technique, the vision system computes the machine coordinates for each corner of the target hole. The drilling coordinates are then computed using these results. According to the blueprint, this location is the center of the corner hole radius tangent to one of the corners of the shaped diffuser target hole 17. The drilling coordinates are comprised of the nominal hole drilling location +/− an offset computed by the vision system based on the actual, observed position of each target hole. Once all the target holes are located by the vision system, a laser drilling program, running on control mechanism 12, is modified by subtracting the error offset for each hole from each programmed laser drilling location stored on storage medium 14. The laser then drills each target hole 17 by firing the required amount of pulses using the modified program.

It is apparent that there has been provided in accordance with the present invention an apparatus, and method for so using, for locating and finish drilling cooling holes using a stereovision guided laser drilling process which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method for assisting the laser drilling of a hole in a part, comprising the steps of:

providing a camera;

providing a target hole at a first position;

capturing a first image of said target hole at said first position with said camera;

moving said target hole to a second position and capturing a second image of said target hole;

computing a drilling location of said target hole from said first image and said second image, said computed drilling location used to drill said target hole; and wherein computing said drilling location of said target hole comprises using image processing software to locate an actual target hole location, and computing an offset between said actual target hole location and a nominal position.

2. The method of claim 1 comprising the additional step of calibrating said laser.

3. The method of claim 2 comprising the additional step of calibrating said camera.

4. The method of claim 1 wherein providing said target hole comprises providing a part having at least one said target hole.

5. The method of claim 4 wherein providing said target hole comprises providing a turbine blade having at least one said target hole.

6. A method for assisting the laser drilling of a hole in a part, comprising the steps of:

providing a camera;

providing a target hole at a first position;

capturing a first image of said target hole at said first position with said camera;

moving said target hole to a second position and capturing a second image of said target hole;

computing a drilling location of said target hole from said first image and said second image, said computed drilling location used to laser drill said target hole;

calibrating said laser; and wherein calibrating said laser comprises the steps of:

providing a calibration block having a pinhole;

aligning a laser beam with said pinhole; and setting a home position of said laser.

7. A method for assisting the laser drilling of a hole in a part, comprising the steps of:

providing a camera;

providing a target hole at a first position;

capturing a first image of said target hole at said first position with said camera;

moving said target hole to a second position and capturing a second image of said target hole;

computing a drilling location of said target hole from said first image and said second image, said computed drilling location used to laser drill said target hole;

calibrating said laser;

calibrating said camera; and wherein calibrating said camera comprising the steps of:

providing a calibration block;

mounting a calibration target on said calibration block;

imaging said calibration target at a plurality of positions along a z-axis with said camera from said first position and said second position;

computing a 3D-to-2D mapping from said imaged calibration target; and storing said 3D-to-2D mapping on a storage medium.

8. A method for assisting the laser drilling of a hole in a part, comprising the steps of:

providing a camera;

providing a target hole at a first position;

capturing a first image of said target hole at said first position with said camera;

moving said target hole to a second position and capturing a second image of said target hole;

computing a drilling location of said target hole from said first image and said second image, said computed drilling location used to laser drill said target hole; and further comprising the additional step of retrieving a nominal position of said target hole from a storage medium, and moving said target hole to said nominal position.

9. An apparatus for laser drilling a hole in a part, comprising:

a laser;

a camera mounted to said laser for capturing a first image of a target hole on a part at a first position and a second image of said target hole at a second position;

means for computing a drilling location of said target hole from said first image and said second image; and a means for identifying and extracting a nominal position of said target hole.

10. An apparatus for laser drilling a hole in a part, comprising:

a laser;

a camera mounted to said laser for capturing a first image of a target hole on a part at a first position and a second image of said target hole at a second position;

means for computing a drilling location of said target hole from said first image and said second image; and a calibration block having a pinhole for determining a home position of said laser.

11. The apparatus of claim 10 wherein said target hole is located in a turbine blade.

* * * * *